United States Patent
Nishida et al.

(10) Patent No.: US 10,246,531 B2
(45) Date of Patent: Apr. 2, 2019

(54) PRODUCTION METHOD FOR OLEFIN-BASED POLYMER, OLEFIN POLYMERIZATION CATALYST, AND OLEFIN-BASED POLYMER

(71) Applicant: IDEMITSU KOSAN CO., LTD., Chiyoda-ku (JP)

(72) Inventors: Masayuki Nishida, Sodegaura (JP); Kanako Samejima, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/302,388

(22) PCT Filed: Apr. 10, 2015

(86) PCT No.: PCT/JP2015/061295
§ 371 (c)(1),
(2) Date: Oct. 6, 2016

(87) PCT Pub. No.: WO2015/156408
PCT Pub. Date: Oct. 15, 2015

(65) Prior Publication Data
US 2017/0022306 A1  Jan. 26, 2017

(30) Foreign Application Priority Data
Apr. 11, 2014 (JP) ................... 2014-082366

(51) Int. Cl.
| | | |
|---|---|---|
| *C08F 110/06* | (2006.01) | |
| *C08F 2/38* | (2006.01) | |
| *C08F 4/54* | (2006.01) | |
| *C08F 4/6592* | (2006.01) | |
| *C08F 10/00* | (2006.01) | |

(52) U.S. Cl.
CPC .............. *C08F 110/06* (2013.01); *C08F 2/38* (2013.01); *C08F 4/54* (2013.01); *C08F 4/6592* (2013.01); *C08F 10/00* (2013.01); *C08F 2500/17* (2013.01)

(58) Field of Classification Search
None
See application file for complete search history.

(56) References Cited

U.S. PATENT DOCUMENTS

| | | |
|---|---|---|
| 5,804,678 A | 9/1998 | Morita et al. |
| 6,124,229 A | 9/2000 | Becker et al. |
| 6,664,208 B1 | 12/2003 | Fujita et al. |
| 2004/0224838 A1 | 11/2004 | Fujita et al. |
| 2005/0197471 A1 | 9/2005 | Fujita et al. |
| 2007/0100105 A1 | 5/2007 | Iseki et al. |
| 2007/0161502 A1* | 7/2007 | Okamoto ............... C07F 17/00 502/152 |
| 2009/0124771 A1* | 5/2009 | Kanamaru ............. C08F 10/00 526/133 |
| 2012/0309902 A1 | 12/2012 | Okabe et al. |
| 2013/0102745 A1 | 4/2013 | Yabukami et al. |

FOREIGN PATENT DOCUMENTS

| | | |
|---|---|---|
| CN | 102906128 A | 1/2013 |
| JP | 7-76604 A | 3/1995 |
| JP | 7-228622 A | 8/1995 |
| JP | 9-110915 A | 4/1997 |
| JP | 11-199625 A | 7/1999 |
| JP | 2001-329007 A | 11/2001 |
| JP | 2003-96110 A | 4/2003 |
| JP | 2011-144293 A | 7/2011 |
| JP | 2011-246559 A | 12/2011 |
| JP | 2012-158762 A | 8/2012 |
| JP | 2013-121932 A | 6/2013 |
| JP | 2013-185075 A | 9/2013 |

OTHER PUBLICATIONS

International Search Report dated Jun. 9, 2015 in PCT/JP2015/061295 filed Apr. 10, 2015.
Extended European Search Report dated Oct. 26, 2017 in Patent Application No. 15776944.9.
Office Action dated Jul. 27, 2018 in Chinese Patent Application No. 201580018967.5 (with English translation), filed Apr. 10, 2015.

* cited by examiner

*Primary Examiner* — Catherine S Branch
(74) *Attorney, Agent, or Firm* — Oblon, McClelland, Maier & Neustadt, L.L.P.

(57) ABSTRACT

Provided is a production method for an olefin-based polymer, including polymerizing an olefin raw material using (A) a transition metal compound, (B) a boron compound capable of forming an ion pair with the component (A), (C) an organoaluminum compound, and (D) water, a molar ratio [(D)/(A)] of a molar quantity of the component (D) to a molar quantity of a transition metal in the component (A) being 5 or more and 10,000 or less.

5 Claims, No Drawings

PRODUCTION METHOD FOR OLEFIN-BASED POLYMER, OLEFIN POLYMERIZATION CATALYST, AND OLEFIN-BASED POLYMER

CROSS-REFERENCE TO RELATED APPLICATIONS

This application is a National Stage of PCT/JP2015/061295, which was filed on Apr. 10, 2015. This application is based upon and claims the benefit of priority to Japanese Application No. 2014-082366, which was filed on Apr. 11, 2014.

TECHNICAL FIELD

The present invention relates to a production method for an olefin-based polymer, an olefin polymerization catalyst, and an olefin-based polymer.

BACKGROUND ART

Hitherto, in a polymerization reaction of an olefin-based polymer, a polymerization catalyst containing, for example, a transition metal compound and a promoter component (e.g., a metallocene catalyst or a Ziegler catalyst) has been generally used. In such polymerization reaction, it is preferred from an economical point of view that activity be improved. In addition, the activity improvement is preferred also from the viewpoint that an amount of a catalyst residue to be contained in a product polymer can be reduced to improve product quality. Therefore, various technological developments concerning the polymerization reaction of the olefin-based polymer have heretofore been made for the purpose of the activity improvement.

An example of the technological developments is specifying of the transition metal compound or the promoter component. In addition to that, reaction conditions have also been investigated in detail. As a result, it has heretofore been found that compounds such as water, carbon monoxide, carbon dioxide, and carbonyl sulfide are catalyst poisons for the polymerization catalyst. Particularly in polymerization involving using a metallocene catalyst having high activity, an amount of the catalyst to be used is small, and hence the catalyst poisons have large influences on the polymerization reaction. On the basis of this finding, various production methods have been developed. For example, there is known a method involving purifying a solvent, a monomer, or the like, to thereby reduce amounts of those compounds to certain amounts or less, and then performing the reaction. As specific means therefor, in Patent Literature 1, there are disclosed methods to be performed before the polymerization reaction, for an impurity contained in the solvent or the monomer to be used, as follows: a method involving allowing an inert gas, such as nitrogen or argon, to flow through the solvent or the monomer; a method involving loading sodium or potassium metal and then performing distillation in an inert gas atmosphere; and a purification method involving using an adsorbent, such as nickel, zinc oxide, copper sulfide, silica, or activated carbon. In addition to that, there is known a method involving adding a scavenger in order to neutralize the poisons of the above-mentioned compounds remaining in a reaction system. For example, in Patent Literature 2, an organoaluminum compound is disclosed as the scavenger.

CITATION LIST

Patent Literature

PTL 1: JP 2011-144293 A
PTL 2: JP 2001-329007 A

SUMMARY OF INVENTION

Technical Problem

In an olefin polymerization process, an unexpected side reaction proceeds during its course to generate a nonpolymerizable unsaturated hydrocarbon. For example, in the course of purifying an olefin raw material, oligomerization of the olefin raw material proceeds owing to a loaded catalyst to generate the nonpolymerizable unsaturated hydrocarbon. In addition, in a step of deactivating the catalyst, postpolymerization of the olefin raw material may proceed owing to the catalyst in an insufficiently deactivated state to cause oligomerization, resulting in the generation of the nonpolymerizable unsaturated hydrocarbon. In addition, in a step of drying a polymer, the polymer may undergo thermal decomposition at the time of its heating to generate the nonpolymerizable unsaturated hydrocarbon. In addition, a nonpolymerizable unsaturated hydrocarbon component is also generated from an organoaluminum compound to be used as a scavenger by dissociation equilibrium. The inventors of the present invention have found that in a polymerization reaction involving using a metallocene complex, when an unexpectedly generated nonpolymerizable unsaturated hydrocarbon is mingled during the purification or a posttreatment step, there occurs a problem in that the nonpolymerizable unsaturated hydrocarbon is inserted into an active site of the metallocene complex to form a dormant species (inactive species), with the result that catalytic activity is markedly reduced.

In addition, when the nonpolymerizable unsaturated hydrocarbon different from the olefin raw material is incorporated into a product polymer, a problem occurs in that its growth reaction is suppressed to reduce its molecular weight, or a polymer is eliminated from a dormant structure to change a terminal structure, and thus a polymer having properties different from those of an intended product polymer is mingled, resulting in a reduction in quality. In recent years, catalytic activity has been dramatically improved due to a further increase in performance of a complex, and in order to express high activity, the course of purifying the above-mentioned olefin raw material, and the recycling process of the olefin raw material left unreacted in the polymerization system have been essential. In addition, it cannot be avoided that a postpolymerization reaction proceeds owing to the high-performance catalyst in a slight residence time at the time of deactivation of the catalyst. Accordingly, the generation of a trace amount of the nonpolymerizable unsaturated hydrocarbon component, and the activity reduction and the quality reduction due to the component have become unavoidable problems.

A method involving using a chain transfer agent is conceivable as a technique for reactivating the dormant species formed by the olefin component different from the raw material monomer, but its effect is unknown. As the chain transfer agent, there is known hydrogen, an alkylzinc, or the like. However, it is known that when hydrogen is used, the degree of polymerization of the polymer is changed. In addition, the alkylzinc has a problem of causing a side reaction.

The present invention has been made in view of the above-mentioned circumstances, and an object of the present invention is to provide a production method for an olefin-based polymer and an olefin polymerization catalyst that provide high catalytic activity at the time of polymerization and that can provide an olefin-based polymer of intended quality, and an olefin-based polymer.

Solution to Problem

The inventors of the present invention have made extensive investigations, and as a result, have found that the above-mentioned object is achieved through the use of a catalyst obtained by bringing specific components into contact with each other. The present invention has been completed on the basis of such finding.

That is, the present invention provides the following items 1 to 11.

1. A production method for an olefin-based polymer, comprising polymerizing an olefin raw material using the following components (A) to (D), a molar ratio [(D)/(A)] of a molar quantity of the component (D) to a molar quantity of a transition metal in the component (A) being 5 or more and 10,000 or less:
    (A) a transition metal compound;
    (B) a boron compound capable of forming an ion pair with the component (A);
    (C) an organoaluminum compound; and
    (D) water.

2. The production method for an olefin-based polymer according to Item 1, wherein the olefin raw material or a polymerization solvent contains (N) a nonpolymerizable unsaturated hydrocarbon.

3. The production method for an olefin-based polymer according to Item 2, wherein the (N) nonpolymerizable unsaturated hydrocarbon comprises a disubstituted olefin, a trisubstituted olefin, or a tetrasubstituted olefin represented by the following general formula (i), or an alkyne represented by the following general formula (ii):

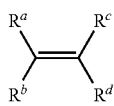

(i)

wherein in the general formula (i), $R^a$ to $R^d$ each independently represent hydrogen or a hydrocarbon group having 1 or more carbon atoms, provided that at least two or more selected from $R^a$ to $R^d$ each represent the hydrocarbon group having 1 or more carbon atoms; and

(ii)

wherein in the general formula (ii), $R^e$ and $R^f$ each independently represent hydrogen or a hydrocarbon group having 1 or more carbon atoms.

4. The production method for an olefin-based polymer according to any one of Items 1 to 3, wherein a molar ratio [(D)/(C)] of the molar quantity of the component (D) to a molar quantity of an aluminum atom in the component (C) is more than 0 and 1 or less.

5. The production method for an olefin-based polymer according to any one of Items 2 to 4, wherein a molar ratio [(N)/(A)] of a molar quantity of the component (N) to a molar quantity of a transition metal in the component (A) is 500 or more.

6. The production method for an olefin-based polymer according to any one of Items 1 to 5, further comprising mixing the component (D) during the polymerizing the olefin raw material in presence of a catalyst obtained by bringing the component (A), the component (B), and the component (C) into contact with each other, so that the molar ratio [(D)/(A)] of the molar quantity of the component (D) and the molar quantity of the transition metal in the component (A) is 5 or more and 10,000 or less, to thereby bringing the component (A), the component (B), the component (C), and the component (D) into contact with each other.

7. The production method for an olefin-based polymer according to any one of Items 1 to 6, wherein the olefin raw material comprises one or more kinds selected from α-olefins each having 3 to 30 carbon atoms and ethylene.

8. An olefin polymerization catalyst, which is obtained by bringing the following components (A) to (D) into contact with each other, wherein a molar ratio [(D)/(A)] of a molar quantity of the component (D) to a molar quantity of a transition metal in the component (A) is 5 or more and 10,000 or less:
    (A) a transition metal compound;
    (B) a boron compound capable of forming an ion pair with the component (A);
    (C) an organoaluminum compound; and
    (D) water.

9. The olefin polymerization catalyst according to Item 8, wherein a molar ratio [(D)/(C)] of the molar quantity of the component (D) to a molar quantity of an aluminum atom in the component (C) is more than 0 and 1 or less.

10. An olefin-based polymer, which is obtained by the production method for an olefin-based polymer of any one of Items 1 to 7.

11. An olefin-based polymer, which is obtained by using the olefin polymerization catalyst of Item 8 or 9.

Advantageous Effects of Invention

According to the present invention, there can be provided the production method for an olefin-based polymer and the olefin polymerization catalyst that provide high catalytic activity at the time of polymerization and that can provide an olefin-based polymer of intended quality, and the olefin-based polymer.

DESCRIPTION OF EMBODIMENTS

[Production Method for Olefin-Based Polymer]

A production method for an olefin-based polymer according to one aspect of the present invention comprises polymerizing an olefin raw material using the following components (A) to (D), a molar ratio [(D)/(A)] of a molar quantity of the component (D) to a molar quantity of a transition metal in the component (A) being 5 or more and 10,000 or less:
    (A) a transition metal compound;
    (B) a boron compound capable of forming an ion pair with the component (A);
    (C) an organoaluminum compound; and
    (D) water.

Now, the components and production method to be used in the present invention are described one by one.

<(A) Transition Metal Compound>

The transition metal compound serving as the component (A) to be used in the present invention only needs to be a complex capable of forming a single-site catalyst having a single active site. Among such complexes, a chelate complex, a metallocene complex having a non-crosslinked ligand or a crosslinked ligand, and the like are preferred.

Examples of the chelate complex include N,N'-bis(2,6-diisopropylphenyl)-1,2-dimethylethylenediiminonickel dibromide and N,N'-bis(2,6-diisopropylphenyl)-1,2-dimethylethylenediiminopalladium dibromide.

Examples of the metallocene complex having a non-crosslinked ligand include biscyclopentadienylzirconium dichloride, bis(n-butylcyclopentadienyl)zirconium dichloride, bis(pentamethylcyclopentadienyl)zirconium dichloride, and bisindenylzirconium dichloride.

The polymerization activity of a metallocene complex in which ligands form a crosslinked structure via a crosslinking group is higher than that of a metallocene complex in which no crosslinked structure is formed.

Therefore, among the metallocene complexes, a metallocene complex in which ligands form a crosslinked structure via a crosslinking group is preferred, a monocrosslinked metallocene complex and a double crosslinked metallocene complex are more preferred, and a double crosslinked metallocene complex is most preferred.

Examples of the monocrosslinked metallocene complex include dimethylsilylene(tetramethylcyclopentadienyl)(3-tert-butyl-5-methyl-2-phenoxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl)zirconium dichloride, dimethylsilylenebis(2-methylindenyl)zirconium dichloride, and ethylenebis(2-methylindenyl)zirconium dichloride.

A specific example of the double crosslinked metallocene complex is a double crosslinked metallocene complex represented by the following general formula (I):

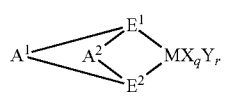

(I)

wherein in the general formula (I), M represents a metal element of Groups 3 to 10 of the periodic table or the lanthanoid series, $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, form a crosslinked structure via $A^1$ and $A^2$, and may be identical to or different from each other, X represents a σ-bonding ligand, and when a plurality of X's are present, the plurality of X's may be identical to or different from each other, and X may be crosslinked with any other X, $E^1$, $E^2$, or Y, Y represents a Lewis base, and when a plurality of Y's are present, the plurality of Y's may be identical to or different from each other, and Y may be crosslinked with any other Y, $E^1$, $E^2$, or X, $A^1$ and $A^2$ each represent a divalent crosslinking group for bonding two ligands, specifically a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group having 1 to 20 carbon atoms, or a halogen-containing hydrocarbon group having 1 to 20 carbon atoms, and may be identical to or different from each other, q represents an integer of from 1 to 5 representing [(valence of M)-2], and r represents an integer of from 0 to 3.

In the general formula (I), M represents a metal element of Groups 3 to 10 of the periodic table or the lanthanoid series, and specific examples thereof include titanium, zirconium, hafnium, yttrium, vanadium, chromium, manganese, nickel, cobalt, palladium, and lanthanoid metals. Among them, titanium, zirconium, and hafnium are suitable in terms of olefin polymerization activity and the like.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR— or >C<], and a silicon-containing group [>SiR— or >Si<], wherein R represents hydrogen, a hydrocarbon group having 1 to 20 carbon atoms, or a hetero atom-containing group, and form a crosslinked structure via $A^1$ and $A^2$.

In addition, $E^1$ and $E^2$ may be identical to or different from each other.

The $E^1$ and $E^2$ each preferably represent a substituted cyclopentadienyl group, an indenyl group, and a substituted indenyl group because polymerization activity is further increased.

In addition, X represents a σ-bonding ligand. When a plurality of X's are present, the plurality of X's may be identical to or different from each other. X may be crosslinked with any other X, $E^1$, $E^2$, or Y.

Specific examples of the X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, and an acyl group having 1 to 20 carbon atoms.

Meanwhile, Y represents a Lewis base. When a plurality of Y's are present, the plurality of Y's may be identical to or different from each other. Y may be crosslinked with any other Y, $E^1$, $E^2$, or X. Specific examples of the Lewis base represented by Y may include amines, ethers, phosphines, and thioethers.

Next, $A^1$ and $A^2$ each represent a divalent crosslinking group for bonding two ligands, specifically a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group having 1 to 20 carbon atoms, or a halogen-containing hydrocarbon group having 1 to 20 carbon atoms, and may be identical to or different from each other.

As such crosslinking group, for example, there is given one represented by the general formula:

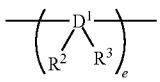

wherein $D^1$ represents carbon, silicon, or tin, $R^2$ and $R^3$ each represent a hydrogen atom or a hydrocarbon group having 1 to 20 carbon atoms, may be identical to or different from each other, and may be bonded to each other to form a ring structure, and e represents an integer of from 1 to 4.

Specific examples thereof include a methylene group, an ethylene group, an ethylidene group, a propylidene group, an isopropylidene group, a cyclohexylidene group, a 1,2-cyclohexylene group, a vinylidene group ($CH_2=C=$), a dimethylsilylene group, a diphenylsilylene group, a methylphenylsilylene group, a dimethylgermirene group, a dimethylstannylene group, a tetramethyldisilylene group, and a diphenyldisilylene group.

Among them, an ethylene group, an isopropylidene group, and a dimethylsilylene group are suitable because polymerization activity is further increased.

q represents an integer of from 1 to 5 representing [(valence of M)-2], and r represents an integer of from 0 to 3.

Among the double crosslinked metallocene complexes each represented by the general formula (I) as described above, a metallocene complex using, as its ligands, double crosslinked biscyclopentadienyl derivatives represented by the general formula (II):

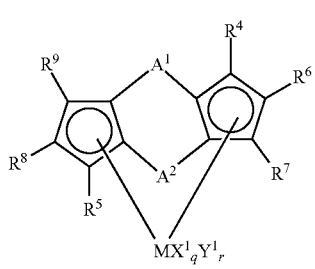

is preferred because polymerization activity is further increased.

In the general formula (II), M, $A^1$, $A^2$, q, and r are the same as those described above.

$X^1$ represents a σ-bonding ligand. When a plurality of $X^1$'s are present, the plurality of $X^1$'s may be identical to or different from each other. $X^1$ may be crosslinked with any other $X^1$ or $Y^1$.

Specific examples of the $X^1$ may include the same examples as those given in the description of X in the general formula (I).

$Y^1$ represents a Lewis base. When a plurality of $Y^1$'s are present, the plurality of $Y^1$'s may be identical to or different from each other. $Y^1$ may be crosslinked with any other $Y^1$ or $X^1$.

Specific examples of the $Y^1$ may include the same examples as those given in the description of Y in the general formula (I).

$R^4$ to $R^9$ each represent a hydrogen atom, a halogen atom, a hydrocarbon group having 1 to 20 carbon atoms, a halogen-containing hydrocarbon group having 1 to 20 carbon atoms, a silicon-containing group, or a hetero atom-containing group, and it is necessary that at least one of $R^4$ to $R^9$ not represent a hydrogen atom.

In addition, $R^4$ to $R^9$ may be identical to or different from each other, and adjacent groups may be bonded to each other to form a ring.

Among them, it is preferred that $R^6$ and $R^7$ form a ring and that $R^8$ and $R^9$ form a ring, because polymerization activity is further increased.

$R^4$ and $R^5$ each preferably represent a group containing a hetero atom, such as oxygen, a halogen, or silicon because polymerization activity is further increased.

The metallocene complex using, as its ligands, the double crosslinked biscyclopentadienyl derivatives preferably contains silicon in a crosslinking group between the ligands.

Specific examples of the double crosslinked metallocene complex represented by the general formula (I) include complexes disclosed in JP 2011-144293 A, and examples thereof include (1,2'-ethylene)(2,1'-ethylene)-bis(indenyl)zirconium dichloride, (1,2'-methylene)(2,1'-methylene)-bis(indenyDzirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)bis(inclenyl)zirconium dichloride, (1,2'-dimethylsilylene)(2,1'-dimethylsilylene)bis(3-methylindenyl)zirconium dichloride, (1,2'-dimethylsilylene)(2,1'-dimethylsilylene)bis(3-n-butyl-indenyl)zirconium dichloride, (1,2'-dimethylsilylene)(2,1'-dimethylsilylene)bis(3-isopropylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-phenylindenyl)zirconium dichloride, and (1,2'-dimethylsilylene)(2,1'-dimethylsilylene)bis(3-neopentyl-indenyl)zirconium dichloride.

Of course, the double crosslinked metallocene complex is not limited thereto.

In addition, the double crosslinked metallocene complex may be an analogous compound of a metal element of any other group or the lanthanoid series.

In addition, in the above-mentioned compounds, (1,2'-)(2,1'-) may be (1,1'-)(2,2'-).

<(B) Boron Compound Capable of Forming Ion Pair with the Component (A)>

An example of the boron compound capable of forming an ion pair with the component (A), which serves as the component (B) to be used in the present invention, may be a coordination complex compound formed of an anion with a plurality of groups bonded to boron and a cation.

There are various types of the coordination complex compound formed of an anion with a plurality of groups bonded to boron and a cation, and for example, a compound represented by the general formula (III) or (IV) may be preferably used:

 (III)

 (IV)

wherein in the general formula (III) or (IV): $L^2$ represents $M^1$, $R^{10}R^{11}M^2$, or $R^{12}{}_3C$ to be described later, $L^1$ represents a Lewis base, $M^1$ represents a metal selected from Group 1 and Group 8 to Group 12 of the periodic table, $M^2$ represents a metal selected from Group 8 to Group 10 of the periodic table, $Z^1$ to $Z^4$ each represent a hydrogen atom, a dialkylamino group, an alkoxy group, an aryloxy group, an alkyl group having 1 to 20 carbon atoms, an aryl group having 6 to 20 carbon atoms, an alkylaryl group, an arylalkyl group, a substituted alkyl group, an organometalloid group, or a halogen atom;

$R^{10}$ and $R^{11}$ each represent a cyclopentadienyl group, a substituted cyclopentadienyl group, an indenyl group, or a fluorenyl group, and $R^{12}$ represents an alkyl group; and s represents an integer of from 1 to 7 representing the ionic valence of $L^1$-H or $L^2$, t represents an integer of 1 or more, and 1=t×s.

$M^1$ represents a metal selected from Group 1 and Group 8 to Group 12 of the periodic table, and specific examples thereof include atoms of Ag, Cu, Na, and Li. $M^2$ represents a metal selected from Group 8 to Group 10 of the periodic table, and specific examples thereof include atoms of Fe, Co, and Ni.

Specific examples of $Z^1$ to $Z^4$ include: dialkylamino groups, such as a dimethylamino group and a diethylamino group; alkoxy groups, such as a methoxy group, an ethoxy group, and a n-butoxy group; aryloxy groups, such as a phenoxy group, a 2,6-dimethylphenoxy group, and a naphthyloxy group; alkyl groups each having 1 to 20 carbon atoms, such as a methyl group, an ethyl group, a n-propyl group, an isopropyl group, a n-butyl group, a n-octyl group, and a 2-ethylhexyl group; aryl groups, alkylaryl groups, or arylalkyl groups each having 6 to 20 carbon atoms, such as a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, and a 1,2-dimethylphenyl group; halogens, such as F, Cl, Br, and I; and organometalloid groups, such as a tetramethylantimony group, a trimethylsilyl group, a trimethylgermyl group, a diphenylarsine group, a dicyclohexylantimony group, and a diphenylboron group.

Specific examples of the substituted cyclopentadienyl group represented by each of $R^{10}$ and $R^{11}$ include a methylcyclopentadienyl group, a butylcyclopentadienyl group, and a pentamethylcyclopentadienyl group.

In the present invention, specific examples of the anion with a plurality of groups bonded to boron include $B(C_6F_5)_4{}^-$, $B(C_6HF_4)_4{}^-$, $B(C_6H_2F_3)_4{}^-$, $B(C_6H_3F_2)_4{}^-$, $B(C_6H_4F)_4{}^-$, $B(C_6CF_3F_4)_4{}^-$, $B(C_6H_5)_4{}^-$, and $BF_4{}^-$.

In addition, examples of the metal cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. In addition, examples of the other cation include: a nitrogen-containing compound, such as pyridinium, 2,4-dinitro-N,N-diethylanilinium, diphenylammonium, p-nitroanilinium, 2,5-dichloroaniline, p-nitro-N,N-dimethylanilinium, quinolinium, N,N-dimethylanilinium, or N,N-diethylanilinium; a carbenium compound, such as triphenylcarbenium, tri(4-methylphenyl)carbenium, or tri(4-methoxyphenyl)carbenium; an alkyl phosphonium ion, such as $CH_3PH_3{}^+$, $C_2H_5PH_3{}^+$, $C_3H_7PH_3{}^+$, $(CH_3)_2PH_2{}^+$, $(C_2H_5)_2PH_2{}^+$, $(C_3H_7)_2PH_2{}^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, or $(C_3H_7)_4P^+$; and an aryl phosphonium ion, such as $C_6H_5PH_3{}^+$, $(C_6H_5)_2PH_2{}^+$, $(C_6H_5)_3PH^+$, $(C_6H_5)_4P^+$, $(C_2H_5)_2(C_6H_5)PH^+$, $(CH_3)(C_6H_5)PH_2{}^+$, $(CH_3)_2(C_6H_5)PH^+$, or $(C_2H_5)_2(C_6H_5)_2P^+$.

In the present invention, there is given a coordination complex compound formed by arbitrarily combining the metal cation and an anion.

Among the compounds of the general formulae (III) and (Iv), specifically, the following compounds may be particularly preferably used.

Examples of the compound of the general formula (III) include triethylammonium tetraphenylborate, tri(n-butyl) ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenynborate, N,N-dimethylanilinium tetrakis(pentafluorophenyl)borate, and methyldiphenylammonium tetrakis(pentafluorophenyl)borate.

Meanwhile, examples of the compound of the general formula (IV) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

A preferred coordination complex compound is one formed of a non-coordinating anion and a substituted triarylcarbenium. As the non-coordinating anion, for example, there may be given a compound represented by the general formula (V):

$$(BZ^1Z^2Z^3Z^4)^- \qquad (V)$$

wherein in the general formula (V), $Z^1$ to $Z^4$ each represent a hydrogen atom, a dialkylamino group, an alkoxy group, an aryloxy group, an alkyl group having 1 to 20 carbon atoms, an aryl group (including a halogen-substituted aryl group) having 6 to 20 carbon atoms, an alkylaryl group, an arylalkyl group, a substituted alkyl group, an organometalloid group, or a halogen atom.

Meanwhile, as the substituted triarylcarbenium, for example, there may be given a compound represented by the general formula (VI).

$$(CR^{13}R^{14}R^{15})^+ \qquad (VI)$$

$R^{13}$, $R^{14}$, and $R^{15}$ in the general formula (VI) each represent an aryl group, such as a phenyl group, a substituted phenyl group, a naphthyl group, or an anthracenyl group, and may be identical to or different from each other, provided that at least one thereof represents a substituted phenyl group, a naphthyl group, or an anthracenyl group.

The substituted phenyl group may be represented by, for example, the general formula (VII).

$$C_6H_{5-k}R^{16}{}_k \qquad (VII)$$

$R^{16}$ in the general formula (VII) represents a hydrocarbyl group having 1 to 10 carbon atoms, an alkoxy group, an aryloxy group, a thioalkoxy group, a thioaryloxy group, an amino group, an amide group, a carboxyl group, or a halogen atom, and k represents an integer of from 1 to 5.

When k represents 2 or more, a plurality of $R^{16}$'s may be identical to or different from each other.

Specific examples of the non-coordinating anion represented by the general formula (V) may include tetra(fluorophenyl)borate, tetrakis(difluorophenyl)borate, tetrakis(tri-fluorophenyl)borate, tetrakis(tetrafluorophenyl)borate, tetrakis(pentafluorophenyl)borate, tetrakis(trifluoromethylphenyl)borate, tetra(toluyl)borate, tetra(xylyl)borate, (triphenyl, pentafluorophenyl)borate, [tris(pentafluorophenyl), phenyl]borate, and tridecahydride-7,8-dicarbaundecaborate.

In addition, specific examples of the substituted triarylcarbenium represented by the general formula (VI) include tri(toluyl)carbenium, tri(methoxyphenyl)carbenium, tri(chlorophenyl)carbenium, tri(fluorophenyl)carbenium, tri(xylyl)carbenium, [di(toluyl), phenyl]carbenium, [di(methoxyphenyl), phenyl]carbenium, [di(chlorophenyl), phenyl]carbenium, [toluyl, di(phenyl)]carbenium, [methoxyphenyl, di(phenyl)]carbenium, and [chlorophenyl, di(phenyl)]carbenium.

The usage ratio (molar ratio) of the component (A) to the component (B) is preferably from 1/100 to 1/1, more preferably from 1/10 to 1/1.

<(C) Organoaluminum Compound>

The organoaluminum compound serving as the component (C) to be used in the present invention is preferably an organoaluminum compound having an alkyl group having 1 or more carbon atoms, specifically a compound represented by the general formula (VIII):

wherein in the general formula (VIII), $R^{17}$ represents an alkyl group having 1 to 20 (preferably 2 to 8) carbon atoms, J represents a hydrogen atom, an alkoxy group having 1 to 20 (preferably 2 to 8) carbon atoms, an aryl group having 6 to 20 carbon atoms, or a halogen atom, v represents an integer of from 1 to 3, and when v represents 2 or more, $R^{17}$'s may be identical to or different from each other, provided that at least one $R^{17}$ represents an alkyl group having 1 to 20 carbon atoms.

Specific examples of the compound represented by the general formula (VIII) include triethylaluminum, triisopropylaluminum, triisobutylaluminum, diethylaluminum chloride, ethylaluminum dichloride, diisobutylaluminum hydride, diethylaluminum hydride, and ethylaluminum sesquichloride.

In addition, an organoaluminum compound represented by the following general formula (iii) is preferably used as the organoaluminum compound serving as the component (C):

wherein in the general formula $R^g$ represents an alkyl group having 1 to 20 (preferably 2 to 8) carbon atoms, and $R^g$'s may be identical to or different from each other.

Specific examples of the compound represented by the general formula (iii) include trimethylaluminum, triethylaluminum, triisopropylaluminum, and triisobutylaluminum.

One kind of those organoaluminum compounds may be used, or two or more kinds thereof may be used in combination.

<(D) Water>

The water serving as the component (D) to be used in the present invention is used so that the molar ratio [(D)/(A)] of the molar quantity of the component (D) to the molar quantity of the transition metal in the component (A) is 5 or more and 10,000 or less.

When the ratio is less than 5, there arises a problem in that an activity-improving effect based on the addition of the water is not expressed. In addition, although its upper limit is not limited, when the value is more than 10,000, there arises a problem in that the water in a system deactivates a catalyst, to thereby reduce its activity.

From such viewpoint, the ratio is preferably from 10 to 5,000, more preferably from 10 to 1,000, still more preferably from 12 to 500, even still more preferably from 15 to 300.

The molar quantity of the component (D) is the molar quantity of the component (D) to be loaded into a polymerization vessel.

Hitherto, the water serving as the component (D) has been considered to be a catalyst poison in olefin polymerization. However, as described later, in a polymerization system in which activity has been reduced owing to the presence of a component (N), when the component (D) is further added to an olefin polymerization catalyst obtained by bringing the components (A) to (C) into contact with each other, so that the molar ratio [(D)/(A)] of the molar quantity of the component (D) to the molar quantity of the transition metal in the component (A) falls within the range of 5 or more and 10,000 or less, surprisingly, catalytic activity is dramatically improved and a product polymer of high quality (that is, a product polymer of intended quality) can be obtained.

In addition, from the viewpoint of obtaining excellent catalytic activity, in an olefin polymerization catalyst to be used in the present invention, the molar ratio [(D)/(C)] of the molar quantity of the component (D) to the molar quantity of an aluminum atom in the component (C) is preferably more than 0, more preferably more than 0.005, still more preferably more than 0.01. In addition, the component (D) in an amount larger than that of the component (C) serves as a catalyst poison, and hence the molar ratio [(D)/(C)] is preferably 1 or less, more preferably 0.95 or less, still more preferably 0.9 or less.

When the molar ratio [(D)/(C)] is 1 or less, an unreacted component (D) directly reacts with an active site of the catalyst to deactivate the active site. Consequently, a rapid reduction in polymerization activity can be prevented.

<(N) Nonpolymerizable Unsaturated Hydrocarbon>

The (N) nonpolymerizable unsaturated hydrocarbon is an unsaturated hydrocarbon compound whose polymerization reaction does not proceed in the presence of the components (A) to (C), and the component (N) is one kind of compound or a mixture of two or more kinds.

For example, when the component (A) is a double cross-linked metallocene complex, examples of the component (N) include: a disubstituted olefin having the α-position of an unsaturated bond substituted with two hydrocarbon groups, a trisubstituted olefin having the α-position of an unsaturated bond substituted with three hydrocarbon groups, or a tetrasubstituted olefin having the α-position of an unsaturated bond substituted with four hydrocarbon groups, represented by the following general formula (i); an alkyne represented by the following general formula (ii); and styrene having an aromatic hydrocarbon at the α-position of an unsaturated bond:

wherein in the general formula (i), $R^a$ to $R^d$ each independently represent hydrogen or a hydrocarbon group having 1 or more carbon atoms, provided that at least two or more selected from $R^a$ to $R^d$ each represent the hydrocarbon group having 1 or more carbon atoms; and

(ii)

wherein in the general formula (ii), $R^e$ and $R^f$ each independently represent hydrogen or a hydrocarbon group having 1 or more carbon atoms.

Another example of the component (N) is an oligomer component of the raw material olefin. In this case, the number of carbon atoms of the component (N) is an integral multiple of (2 times, 3 times, 4 times, . . . ) the number of carbon atoms of the olefin raw material. For example, in the case of a polymerization reaction using propylene as the olefin raw material, the component (N) includes: compounds each having twice as many carbon atoms as those of propylene, such as 3-methyl-2-pentene, 2-hexene, 3-hexene, 2-methyl-2-pentene, 2,3-dimethylbutene, 3-methyl-2-pentene, 2,3-dimethyl-1-butene, 4-methyl-2-pentene, 1-hexyne, 2-hexyne, and 3-hexyne; and compounds each having three times as many carbon atoms as those of propylene, such as 2-nonene, 3-nonene, 4-nonene, 2-methyl-2-octene, 3-methyl-2-octene, 4-methyl-2-octene, 5-methyl-2-octene, 6-methyl-2-octene, 7-methyl-2-octene, 2,3-dimethyl-2-octene, 2,4-dimethyl-2-octene, 2,5-dimethyl-2-octene, 2,6-dimethyl-2-octene, 2-ethyl-3-methyl-2-hexene, 2-ethyl-4-methyl-2-hexene, 2-ethyl-4-methyl-2-hexene, 2-methyl-3-ethyl-2-hexene, 2-methyl-3-ethyl-4-hexene, 2-methyl-3-ethyl-5-hexene, 2,4-nonadiene, 2,5-nonadiene, 2,6-nonadiene, 2,7-nonadiene, 2-nonyne, 3-nonyne, and 4-nonyne. One kind or two or more kinds of those compounds may be contained.

<Presumed Mechanism of Catalytic Activity Reduction by Component (N) and Activity Reduction Suppression by Component (D)>

As described above, the component (D) is considered to be a catalyst poison, and hence polymerization is generally performed under such a condition that the molar ratio [(D)/(A)] is less than 5. It is considered that when the component (N) is present under such condition, the component (N) is inserted into an active site of the catalyst obtained by bringing the components (A) to (C) into contact with each other to form a dormant species (inactive species), with the result that catalytic activity is markedly reduced.

Although a detailed reason is not clear, it is considered that the vicinity of the unsaturated bond of the component (N) is sterically bulky, and hence the component (N) is coordinated to the active site to increase the activation energy for the insertion into a polymer chain, resulting in the suppression of a reaction. Probably because of this, when the component (N) is subjected to a reaction with an active species of the catalyst obtained by bringing the components (A) to (C) into contact with each other, the dormant species is formed.

In contrast, in the present invention, although a detailed reason is not clear, it is considered that by virtue of the mixing of the component (D) within the range of the molar ratio [(D)/(A)], even when the component (N) is present, the formation of the dormant species, that is, the reaction between the component (A) and the component (N) is inhibited, or the component (N) or an impurity generated because of the component (N) is separated from the generated dormant species to reactivate the component (A), and thus catalytic activity is improved.

<Factor of Generation of Component (N)>

A production process for the olefin-based polymer is not particularly limited, and includes a production process for the olefin-based polymer involving a step of purifying the olefin raw material, a polymerization step, a catalyst deactivation step, and a step of recycling the olefin raw material and the polymerization solvent.

A mechanism by which the nonpolymerizable unsaturated hydrocarbon serving as the component (N) is present in the olefin raw material or the polymerization solvent is, for example, as follows: the case of being mingled as an impurity in the olefin raw material; the case of being generated from the organoaluminum compound serving as the component (C) by dissociation equilibrium in the catalyst preparation step or the polymerization step in the production process for the olefin-based polymer; the case of being generated through the purification step; the case of being generated through the polymerization step; the case of being generated through the catalyst deactivation step; or the case of being generated by thermal decomposition of the polymer in a step of devolatilizing a polymerization solution.

When the component (C) is used as a scavenger, the olefin component different from the raw material monomer (which serves as the nonpolymerizable unsaturated hydrocarbon serving as the component (N)) is generated from the component (C) to be used as the scavenger by dissociation equilibrium. For example, in the case of triisobutylaluminum, an olefin component such as isobutylene is generated.

In the course of purifying the olefin raw material, oligomerization of the monomer proceeds owing to a loaded catalyst to generate the component (N).

In the polymerization reaction of the olefin raw material, when abnormal insertion on the active site occurs, the component (N) is generated.

In the catalyst deactivation step, oligomerization of the olefin raw material proceeds owing to an insufficiently deactivated catalyst to generate the component (N).

In the polymerization solution devolatilization step or distillation step, a heated polymer undergoes thermal decomposition to generate the component (N).

In order to recover an unreacted olefin raw material or the polymerization solvent from the polymerization solution for reuse in the polymerization step, the recycling step includes a step of removing a fraction heavier than the olefin raw material or the polymerization solvent, or a step of removing a lighter fraction. The component (N) generated by the above-mentioned mechanism is incorporated into the unreacted olefin raw material or the polymerization solvent, but particularly when in the recycling step, a difference between the boiling point of the component (N) and the boiling point of the olefin raw material or the polymerization solvent is 50° C. or less, the component (N) is difficult to separate from the unreacted olefin raw material or the polymerization solvent. The component (N) is more difficult to separate when the difference between the boiling points is 20° C. or less, and is still more difficult to separate when the difference is 10° C. or less. As a result, the unreacted olefin raw material or the solvent containing the component (N) is used again in the polymerization step. It is considered that in the polymerization step, the nonpolymerizable unsaturated hydrocarbon serving as the component (N) is gradually concentrated, and the component (N) is inserted into the active site of the catalyst to form a dormant species, with the result that catalytic activity is reduced.

Particularly in a polymerization step using a metallocene catalyst, when the component (N) is mingled at a molar ratio of its molar quantity of 500 or more with respect to the molar quantity of the transition metal in the component (A), a problem occurs in that the olefin component is inserted into an active site of the metallocene complex to form a dormant species, with the result that catalytic activity is markedly reduced.

Therefore, the production method for an olefin-based polymer and an olefin polymerization catalyst to be described later of the present invention can be more effectively used when the molar ratio [(N)/(A)] of the molar quantity of the component (N) to the molar quantity of the transition metal in the component (A) is 500 or more, and in particular, from the viewpoint that a continuous polymerization system capable of maintaining excellent catalytic activity can be achieved, are useful in a continuous polymerization system including a step of recycling a polymerization solvent or the like.

<Olefin Raw Material>

In the production method for an olefin-based polymer involving using the olefin polymerization catalyst of the present invention, the olefin raw material is homopolymerized or copolymerized in the presence of the components (A) to (D). In addition, the olefin raw material and one or more kinds selected from other raw materials may be copolymerized.

The olefin raw material differs depending on the polymerization catalyst to be used, and is not particularly limited, but is preferably ethylene or an α-olefin having 3 to 30 carbon atoms. Examples of the α-olefin having 3 to 30 carbon atoms include α-olefins, such as propylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, and vinylcyclohexane.

In addition, examples of the other raw materials include: dienes, such as 1,3-butadiene, 1,4-pentadiene, and 1,5-hexadiene; halogen-substituted α-olefins, such as hexafluoropropene, tetrafluoroethylene, 2-fluoropropene, fluoroethylene, 1,1-difluoroethylene, 3-fluoropropene, trifluoroethylene, and 3,4-dichloro-1-butene; cyclic olefins, such as cyclopentene, cyclohexene, norbornene, 5-methylnorbornene, 5-ethylnorbornene, 5-propylnorbornene, 5,6-dimethylnorbornene, and 5-benzylnorbornene; and styrene-based compounds, e.g., alkylstyrenes, such as styrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, and 3,5-dimethylstyrene, alkoxystyrenes, such as p-methoxystyrene, o-methoxystyrene, and m-methoxystyrene, halogenated styrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene, and further, trimethylsilylstyrene, a vinylbenzoic acid ester, and divinylbenzene.

One kind of the olefin raw materials may be used, or two or more kinds thereof may be used in combination. In addition, the olefin raw material may be used in combination with one or more kinds selected from other raw materials.

Among them, one or more kinds selected from α-olefins each having 3 to 30 carbon atoms and ethylene are preferably used. That the one or more kinds selected from α-olefins each having 3 to 30 carbon atoms and ethylene are preferably used means the following cases as well: two or more kinds of α-olefins each having 3 to 30 carbon atoms are used; and two or more kinds selected from α-olefins each having 3 to 30 carbon atoms are used in combination with ethylene.

<Polymerization Solvent>

There is no particular limitation on the polymerization solvent. Examples thereof include: aromatic hydrocarbons, such as benzene, toluene, xylene, and ethyl benzene; alicyclic hydrocarbons, such as cyclopentane, cyclohexane, methylcyclohexane, decalin, and tetralin; aliphatic hydrocarbons, such as pentane, hexane, heptane, and octane; and halogenated hydrocarbons, such as chloroform and dichloromethane. Among them, toluene, xylene, and decalin are preferred.

One kind of those solvents may be used alone, or two or more kinds thereof may be used in combination. In addition, a monomer, such as the α-olefin, to be used for polymerization may be used as the solvent.

<Polymerization Method>

A polymerization method in the production method for an olefin-based polymer of the present invention is not particularly limited, and any polymerization method, such as a slurry polymerization method, a solution polymerization method, a vapor phase polymerization method, a bulk polymerization method, or a suspension polymerization method, may be adopted.

A polymerization temperature is generally from −100° C. to 250° C., preferably from −50° C. to 200° C., more preferably from 0° C. to 130° C.

A polymerization pressure is preferably from normal pressure to 20 MPa (gauge), more preferably from normal pressure to 10 MPa (gauge).

A polymerization time is preferably from 5 minutes to 15 hours.

Further, as a method of controlling the molecular weight of the olefin-based polymer, for example, there are given: selection of the kind and use amount of each component, and the polymerization temperature; and polymerization in the presence of hydrogen.

In the production method for an olefin-based polymer of the present invention, the concentration of the component (A) is preferably from 0.001 μmol/L to 500 μmol/L. When the concentration falls within this range, satisfactory activity is obtained. From such viewpoint, the concentration of the component (A) is more preferably from 0.005 μmol/L to 250 μmol/L, still more preferably from 0.01 μmol/L to 100 μmol/L. The concentration of the component (A) herein refers to the concentration of the component (A) in a polymerization liquid. Therefore, the concentration of the component (A) refers to the following amount: in the case of a reaction system using a solvent and a liquid monomer, the amount of the component (A) with respect to the total amount of the solvent and the liquid monomer; when a liquid monomer is subjected to a reaction without the use of a solvent, the amount of the component (A) with respect to the liquid monomer; or when a gaseous monomer is subjected to a reaction using a solvent, the amount of the component (A) with respect to the solvent.

In the production method for an olefin-based polymer of the present invention, the concentration of the component (C) is preferably from 0.0005 mmol/L to 10 mmol/L. When the concentration falls within this range, satisfactory activity is obtained. From such viewpoint, the concentration of the component (C) is more preferably from 0.007 mmol/L to 5 mmol/L, still more preferably from 0.01 mmol/L to 3 mmol/L. The concentration of the component (C) herein refers to the concentration of the component (C) in a polymerization liquid. Therefore, the concentration of the component (C) refers to the following amount: in the case of a reaction system using a solvent and a liquid monomer, the amount of the component (C) with respect to the total amount of the solvent and the liquid monomer; when a liquid monomer is subjected to a reaction without the use of a solvent, the amount of the component (C) with respect to the liquid monomer; or when a gaseous monomer is subjected to a reaction using a solvent, the amount of the component (C) with respect to the solvent.

In the production method for an olefin-based polymer of the present invention, the concentration of the component (D) is preferably from 0.0001 mmol/L to 10 mmol/L. When the concentration falls within this range, satisfactory activity is obtained. From such viewpoint, the concentration of the component (D) is more preferably from 0.0005 mmol/L to 2 mmol/L, still more preferably from 0.001 mmol/L to 1.4 mmol/L. The concentration of the component (D) herein refers to the concentration of the component (D) in a polymerization liquid. Therefore, the concentration of the component (D) refers to the following amount: in the case of a reaction system using a solvent and a liquid monomer, the amount of the component (D) with respect to the total amount of the solvent and the liquid monomer; when a liquid monomer is subjected to a reaction without the use of a solvent, the amount of the component (D) with respect to the liquid monomer; or when a gaseous monomer is subjected to a reaction using a solvent, the amount of the component (D) with respect to the solvent.

Further, in the production method for an olefin-based polymer of the present invention, it is preferred that preliminary polymerization using the olefin polymerization catalyst to be described later or preliminary polymerization during the course of the preparation of the catalyst be performed. The preliminary polymerization may be performed by bringing the catalyst or the catalyst during its preparation into contact with a small amount of an olefin, and a reaction temperature in this case is preferably from −20° C. to 100° C., more preferably from −10° C. to 70° C., still more preferably from 0° C. to 50° C. In addition, as a solvent to be used in the preliminary polymerization, a solvent selected from the above-mentioned polymerization solvents is preferably used, and an aliphatic hydrocarbon or an aromatic hydrocarbon is more preferred. The preliminary polymerization may be performed without any solvent. The amount of a preliminary polymerization product per 1 mmol of a transition metal component in the catalyst is preferably from 1 g to 10,000 g, and it is more preferred that conditions be adjusted so that the amount may be from 10 g to 1,000 g.

[Olefin Polymerization Catalyst]

An olefin polymerization catalyst according to one aspect of the present invention is an olefin polymerization catalyst, which is obtained by bringing the following components (A) to (D) into contact with each other, wherein a molar ratio [(D)/(A)] of a molar quantity of the component (D) to a molar quantity of a transition metal in the component (A) is 5 or more and 10,000 or less:

(A) a transition metal compound;
(B) a boron compound capable of forming an ion pair with the component (A);
(C) an organoaluminum compound; and
(D) water.

The components (A) to (D) are the same as the components (A) to (D) described above in the production method for an olefin-based polymer, and preferred examples thereof are also the same.

<Preparation Method for Olefin Polymerization Catalyst>

A preparation method for the olefin polymerization catalyst is not particularly limited, and a hitherto known method may be utilized.

For example, the olefin polymerization catalyst may be prepared by adding the component (C) to a polymerization solvent and then adding the component (A), the component (B), and the component (D) to bring the components into contact with each other. In addition, the mixing order of the component (A), the component (B), and the component (D) may be changed. The following order is most preferred: after the addition of the component (C) to the polymerization solvent, the component (D) is added, and then the component (A) or the component (B) is added. The component (D) also serves as a deactivating agent for the component (A), and hence it is not preferred that the component (D) and the component (A) be brought into contact with each other without the addition of the component (C).

Further, the olefin polymerization catalyst may be prepared in a polymerization reaction vessel by loading the components into the polymerization reaction vessel, or may be prepared by mixing the components in another container in advance to prepare a catalyst solution, and loading the resultant catalyst solution into the polymerization reaction vessel to perform a polymerization reaction. As the solvent to be used in the preparation of the olefin polymerization catalyst, the polymerization solvent exemplified in the production method for an olefin-based polymer described above is preferably used.

The timing of mixing the component (D) with the components (A) to (C) to bring the components into contact with each other may be as follows: the component (D) may be mixed during the preparation of a preliminarily activated catalyst obtained through preliminary polymerization by mixing the components (A) to (C) in another container in advance, may be mixed after the preparation of the preliminarily activated catalyst, may be mixed before the polymerization reaction of the olefin-based polymer, or may be mixed after the initiation of polymerization to be brought into contact with the other components. In order to effectively utilize the effect of the component (D), it is preferred that the component (D) be present in the system at the initiation of the polymerization of the olefin-based polymer.

The ratio between the molar quantity of the component (D) and the molar quantity of each component described above is a ratio in the final amounts of the components (A) to (D), and the ratios may be calculated from values determined by a method described in Examples to be described later for the molar quantities of the component and atoms in the components prior to mixing of the components.

[Olefin-Based Polymer]

Through the use of the production method for an olefin-based polymer or the olefin polymerization catalyst of the present invention, in particular, polypropylene, polyethylene, or a copolymer of two or more kinds selected from α-olefins each having 3 to 30 carbon atoms and ethylene can be obtained with high polymerization activity and intended quality.

Herein, the intended quality refers to quality to be influenced as follows: as described above, the component (N) different from the olefin raw material suppresses a growth reaction to reduce a molecular weight, or eliminates the olefin-based polymer from a dormant structure, and thus a terminal structure is changed; the component (N) is incorporated into the olefin-based polymer as a product, and thus a polymer having a primary structure different from that of the intended olefin-based polymer (e.g., stereoregularity, molecular weight, and molecular weight distribution) is mingled. Examples of the quality include various mechanical characteristics, such as a tensile strength, a tensile strain, and a modulus of elasticity, and characteristics such as a melting point and a limiting viscosity.

EXAMPLES

Next, the present invention is described in more detail with reference to examples, but the present invention is not limited thereto.

[Measurement Methods]

Measurement values in the following Examples and Comparative Examples were measured using the methods described below.

(Measurement of Concentration of Component (N) in Polymerization Solvent)

The concentration of the component (N) was quantified by creating a calibration curve through gas chromatography (GC) measurement of a polymerization solvent. A sampled polymerization solvent was subjected to measurement using gas chromatography (trade name: 6890N, manufacturer: Agilent Technologies). The measurement was performed under the following conditions: column used: HP-1 (total length: 60 m, inner diameter: 32 mm, film thickness: 5 μm); temperature increase conditions: 50° C. (5 minutes)→temperature increase at 10° C./min→230° C. (17 minutes); injection volume: 1 μL; split: 50; injection: 200° C.; FID: 250° C.; linear velocity: 30 cm/second; flow rate: 2.2 mL/minute; and pressure: 129 kPa. In the following Examples and Comparative Examples, 2-methyl-1-pentene observed as a peak at 12.8 minutes and 2-methyl-2-pentene observed as a peak at 13.4 minutes were each used as the component (N) and measured for their concentration in the polymerization solvent.

(Measurement of Concentration of Component (N) in Gas Portion)

Gas sampling was performed with a Tedlar pack, and the concentration of the component (N) was quantified by creating a calibration curve through gas chromatography (GC) measurement. A sampled polymerization solvent was subjected to measurement using gas chromatography (trade name: 6890N, manufacturer: Agilent Technologies). The measurement was performed under the following conditions: column used: HP-1 (total length: 60 m, inner diameter: 32 mm, film thickness: 5 μm); temperature increase conditions: 50° C. (5 minutes)→temperature increase at 10° C./minute→230° C. (17 minutes); injection volume: 0.1 mL; split: 10; injection: 200° C.; FID: 250° C.; linear velocity: 30 cm/second; flow rate: 2.2 mL/minute; and pressure: 131 kPa. In the following Examples and Comparative Examples, 2-methyl-1-pentene observed as a peak at 12.8 minutes and 2-methyl-2-pentene observed as a peak at 13.4 minutes were each used as the component (N) and measured for their concentration in the polymerization solvent.

(Measurement of Limiting Viscosity [η] of Olefin-Based Polymer)

The limiting viscosity of an obtained olefin-based polymer was measured for a 0.02 g/dL to 0.16 g/dL solution at 135° C. using a viscometer (manufactured by Rigo Co., Ltd., trade name: "VMR-053U-PC-F01"), an Ubbelohde-type viscosity tube (bulb volume in measurement: 2 ml to 3 ml, capillary diameter: 0.44 mm to 0.48 mm), and tetralin as a solvent.

Production Example 1 (Preparation of Olefin Polymerization Catalyst A)

Under a stream of nitrogen at 25° C., a 1 L autoclave was loaded with anhydrous m-xylene (394 mL), then 6 mL (in terms of aluminum: 2 mol/L) of a heptane solution of triisobutylaluminum was added thereto, and the mixture was stirred. To the solution, (1,2'-dimethylsilylene)(2,1'-dimethylsilylene)bis(3-neopentyl-indenyl)zirconium dichloride (1.03 g, 1.6 mmol) and dimethylanilinium tetrakis(pentafluorophenyl)borate (1.92 g, 2.4 mmol) were added. While the mixture was stirred, the autoclave was charged with a propylene gas (0.05 MPa, 5.73 L), the temperature was increased to 40° C., and a reaction was performed for 1 hour to provide a solution of a catalyst A.

Production Example 2 (Preparation of Olefin Polymerization Catalyst B)

Under a stream of nitrogen at 25° C., a 1 L autoclave was loaded with anhydrous m-xylene (394 mL), then 6 mL (in terms of aluminum: 2 mol/L) of a heptane solution of triisobutylaluminum was added thereto, and the mixture was stirred. To the solution, (1,2'-dimethylsilylene)(2,1'-dimethylsilylene)bisindenylzirconium dichloride (0.81 g, 1.6 mmol) and dimethylanilinium tetrakis(pentafluorophenyl)borate (1.92 g, 2.4 mmol) were added. While the mixture was stirred, the autoclave was charged with a propylene gas (0.05 MPa, 5.73 L), the temperature was increased to 40° C., and a reaction was performed for 1 hour to provide a solution of a catalyst B.

Production Example 3 (Preparation of Olefin Polymerization Catalyst C)

Under a stream of nitrogen at 25° C., a 1 L autoclave was loaded with anhydrous m-xylene (394 mL), then 6 mL (in terms of aluminum: 2 mol/L) of a heptane solution of triisobutylaluminum was added thereto, and the mixture was stirred. To the solution, (1,2'-dimethylsilylene)(2,1'-dimethylsilylene)bis(3-trimethylsilylmethyl-indenyl)zirconium dichloride (1.08 g, 1.6 mmol) and dimethylanilinium tetrakis (pentafluorophenylkorate (1.92 g) were added. While the mixture was stirred, the autoclave was charged with a propylene gas (0.05 MPa, 5.73 L), the temperature was increased to 40° C., and a reaction was performed for 1 hour to provide a solution of a catalyst C.

Example 1

A stainless-steel reaction vessel having an internal volume of 250 L with a stirrer was continuously supplied with n-heptane at 26 L/h, triisobutylaluminum at 25.5 mmol/h in terms of aluminum, water at 0.55 mmol/h, and the catalyst A at 2.7 μmol/h in terms of zirconium. At this time, the number of moles of water with respect to the catalyst A was 200 equivalents.

The polymerization temperature was set to 70° C., and a polymerization reaction was performed while propylene and hydrogen were continuously supplied so that the hydrogen partial pressure and the total pressure in the reaction vessel were kept at 0.05 MPa and 1.0 MPa, respectively.

The n-heptane serving as the solvent of the resultant polymerization solution was removed to provide polypropylene (polymerization activity: 24 tPP/gZr, [η]=0.74 dL/g). The results are shown in Table 1 below.

Example 2

A stainless-steel reaction vessel having an internal volume of 250 L with a stirrer was continuously supplied with n-heptane at 26 L/h, triisobutylaluminum at 7.7 mmol/h in terms of aluminum, water at 0.27 mmol/h, and the catalyst A at 2.7 μmol/h in terms of zirconium. At this time, the number of moles of water with respect to the catalyst A was 100 equivalents.

The polymerization temperature was set to 70° C., and a polymerization reaction was performed while propylene and hydrogen were continuously supplied so that the hydrogen partial pressure and the total pressure in the reaction vessel were kept at 0.24 MPa and 1.0 MPa, respectively.

The n-heptane serving as the solvent of the resultant polymerization solution was removed to provide polypropylene (polymerization activity: 25 tPP/gZr, [η]=0.58 dL/g). The results are shown in Table 1 below.

Example 3

A stainless-steel reaction vessel having an internal volume of 250 L with a stirrer was continuously supplied with n-heptane at 26 L/h, triisobutylaluminum at 11.7 mmol/h in terms of aluminum, water at 0.23 mmol/h, and the catalyst B at 0.9 μmol/h in terms of zirconium. At this time, the number of moles of water with respect to the catalyst B was 250 equivalents.

The polymerization temperature was set to 70° C., and a polymerization reaction was performed while propylene and hydrogen were continuously supplied so that the hydrogen partial pressure and the total pressure in the reaction vessel were kept at 0.02 MPa and 1.0 MPa, respectively.

The n-heptane serving as the solvent of the resultant polymerization solution was removed to provide polypropylene (polymerization activity: 30 tPP/gZr). The results are shown in Table 1 below.

Comparative Example 1

A stainless-steel reaction vessel having an internal volume of 250 L with a stirrer was continuously supplied with n-heptane at 26 L/h, triisobutylaluminum at 25.5 mmol/h in terms of aluminum, and the catalyst A at 18.0 μmol/h in terms of zirconium.

The polymerization temperature was set to 70° C., and a polymerization reaction was performed while propylene and hydrogen were continuously supplied so that the hydrogen partial pressure and the total pressure in the reaction vessel were kept at 0.05 MPa and 1.0 MPa, respectively.

The n-heptane serving as the solvent of the resultant polymerization solution was removed to provide polypropylene (polymerization activity: 3 tPP/gZr, [η]=0.73 dL/g). The results are shown in Table 1 below.

Comparative Example 2

A stainless-steel reaction vessel having an internal volume of 250 L with a stirrer was continuously supplied with n-heptane at 26 L/h, triisobutylaluminum at 7.7 mmol/h in terms of aluminum, water at 0.04 mmol/h, and the catalyst A at 18 μmol/h in terms of zirconium. At this time, the number of moles of water with respect to the catalyst A was 2 equivalents.

The polymerization temperature was set to 66° C., and a polymerization reaction was performed while propylene and hydrogen were continuously supplied so that the hydrogen partial pressure and the total pressure in the reaction vessel were kept at 0.24 MPa and 1.0 MPa, respectively.

The n-heptane serving as the solvent of the resultant polymerization solution was removed to provide polypropylene (polymerization activity: 1 tPP/gZr, [η]=0.57 dL/g). The results are shown in Table 1 below.

Comparative Example 3

A stainless-steel reaction vessel having an internal volume of 250 L with a stirrer was continuously supplied with n-heptane at 26 L/h, triisobutylaluminum at 7.3 mmol/h in terms of aluminum, and the catalyst B at 48.0 μmol/h in terms of zirconium.

The polymerization temperature was set to 60° C., and a polymerization reaction was performed while propylene and hydrogen were continuously supplied so that the hydrogen partial pressure and the total pressure in the reaction vessel were kept at 0.02 MPa and 1.0 MPa, respectively.

The n-heptane serving as the solvent of the resultant polymerization solution was removed, but no olefin-based polymer was obtained (polymerization activity: 0 tPP/gZr). The results are shown in Table 1 below.

TABLE 1

| Item | Example 1 | Example 2 | Example 3 | Comparative Example 1 | Comparative Example 2 | Comparative Example 3 |
|---|---|---|---|---|---|---|
| Kind of complex | Catalyst A | Catalyst A | Catalyst B | Catalyst A | Catalyst A | Catalyst B |
| Addition amount of component (A) (μmol-Zr/h)*1 | 2.7 | 2.7 | 0.9 | 18 | 18 | 48 |
| Addition amount of component (D) (mmol/h) | 0.55 | 0.27 | 0.23 | 0 | 0.04 | 0 |
| Molar ratio [(D)/(A)] (mol/mol-Zr)*2 | 200 | 100 | 250 | 0 | 2 | 0 |
| Molar ratio [(D)/(C)] (mol/mol-Al)*3 | 0.021 | 0.035 | 0.019 | 0 | 0.005 | 0 |

TABLE 1-continued

| Item | Example 1 | Example 2 | Example 3 | Comparative Example 1 | Comparative Example 2 | Comparative Example 3 |
|---|---|---|---|---|---|---|
| Polymerization activity (tPP/gZr)*4 | 24 | 25 | 30 | 3 | 1 | 0 |
| [η] (dL/g) | 0.74 | 0.58 | — | 0.73 | 0.57 | — |

*1: Molar quantity in terms of zirconium (Zr)
*2: Ratio of molar quantity of component (D) to molar quantity of Zr in component (A)
*3: Ratio of molar quantity of component (D) to molar quantity of Al in component (C)
*4: Amount of polypropylene obtained per 1 g of Zr in component (A)

Example 4

A stainless-steel reaction vessel having an internal volume of 68.2 m$^3$ with a stirrer was continuously supplied with recycled n-heptane, which was obtained by purifying a solvent after polymerization by distillation, at 5,200 L/h, triisobutylaluminum at 159.4 mmol/h in terms of aluminum, water at 15 mmol/h, and the catalyst C at 990 μmol/h in terms of zirconium. At this time, the number of moles of water with respect to the catalyst C was 15 equivalents.

The polymerization temperature was set to 85° C., and a polymerization reaction was performed by continuously supplying hydrogen, and propylene containing recycled propylene obtained by purifying a gas after polymerization by distillation and non-recycled propylene at a ratio of 3:1, so that the reaction vessel contained 3.5 vol % of hydrogen and 73 vol % of propylene having mingled therein nonpolymerizable unsaturated hydrocarbons, while keeping the total pressure at 1.7 MPa. The polymerization solution was continuously transferred to another vessel, and then heated at 180° C. under the pressure condition of 0.6 MPa to be separated into a gas portion and a solution portion. At this time, the flow rate of the gas portion was 1,300 kg/h, and the flow rate of the solution portion was 3.5 t/h. The gas portion separated at this time was subjected to GC analysis, and as a result, 973 ppm by volume of the nonpolymerizable unsaturated hydrocarbons were observed (746 ppm by volume of 2-methyl-1-pentene, and 227 ppm by volume of 2-methyl-2-pentene). The solution portion separated at this time was subjected to GC analysis, and as a result, 91 ppm by mass of the nonpolymerizable unsaturated hydrocarbons were observed (38 ppm by mass of 2-methyl-1-pentene, 46 ppm by mass of 2-methyl-2-pentene, and 7 ppm by mass of 2-hexene). The molar ratio of the nonpolymerizable unsaturated hydrocarbons in the gas portion and the solution portion expressed in terms of zirconium was as follows: (N)/(A)=34,141 (mol/mol-Zr).

The n-heptane serving as the solvent was removed from the resultant polymerization solution to provide polypropylene (polymerization activity: 18 tPP/gZr, [η]=0.56 dL/g). The results are shown in Table 2 below.

Example 5

A stainless-steel reaction vessel having an internal volume of 250 L with a stirrer was continuously supplied with n-heptane having mingled therein 1,000 ppm by mass of 2-methyl-2-pentene at 26 L/h, triisobutylaluminum at 25.5 mmol/h in terms of aluminum, water at 2.1 mmol/h, and the catalyst C at 7.4 μmol/h in terms of zirconium. At this time, the number of moles of water with respect to the catalyst C was 280 equivalents.

The polymerization temperature was set to 65° C., and a polymerization reaction was performed while propylene and hydrogen were continuously supplied so that the hydrogen partial pressure and the total pressure in the reaction vessel were kept at 0.16 MPa and 1.0 MPa, respectively. The n-heptane serving as the solvent of the resultant polymerization solution was removed to provide polypropylene (polymerization activity: 11 tPP/gZr, [η]=0.83 dL/g). The results are shown in Table 2 below.

Comparative Example 4

A stainless-steel reaction vessel having an internal volume of 68.2 m$^3$ with a stirrer was continuously supplied with recycled n-heptane, which was obtained by purifying a solvent after polymerization by distillation, at 5,200 L/h, triisobutylaluminum at 90.9 mmol/h in terms of aluminum and the catalyst C at 5,570 μmol/h in terms of zirconium.

The polymerization temperature was set to 85° C., and a polymerization reaction was performed by continuously supplying hydrogen, and propylene containing recycled propylene obtained by purifying a gas after polymerization by distillation and non-recycled propylene at a ratio of 3:1, so that the reaction vessel contained 4.1 vol % of hydrogen and 78 vol % of propylene, while keeping the total pressure at 1.7 MPa. The polymerization solution was continuously transferred to another vessel, and then heated at 180° C. under the pressure condition of 0.6 MPa to be separated into a gas portion and a solution portion. At this time, the flow rate of the gas portion was 1,100 kg/h, and the flow rate of the solution portion was 3.5 t/h. The gas portion separated at this time was subjected to GC analysis, and as a result, 973 ppm by volume of the nonpolymerizable unsaturated hydrocarbons were observed (746 ppm by volume of 2-methyl-1-pentene, and 227 ppm by volume of 2-methyl-2-pentene). The solution portion separated at this time was subjected to GC analysis, and as a result, 91 ppm by mass of the nonpolymerizable unsaturated hydrocarbons were observed (38 ppm by mass of 2-methyl-1-pentene, 46 ppm by mass of 2-methyl-2-pentene, and 7 ppm by mass of 2-hexene). The molar ratio of the nonpolymerizable unsaturated hydrocarbons in the gas portion and the solution portion expressed in terms of zircon was as follows: (N)/(A)=5,242.

The n-heptane serving as the solvent of the resultant polymerization solution was removed, but no polymer was obtained (polymerization activity: 0.1 tPP/gZr, [η]=0.56 dL/g). The results are shown in Table 2 below.

Comparative Example 5

A stainless-steel reaction vessel having an internal volume of 250 L with a stirrer was continuously supplied with n-heptane having mingled therein 1,000 ppm by mass of 2-methyl-2-pentene at 26 L/h, triisobutylaluminum at 25.5 mmol/h in terms of aluminum, and the catalyst C at 9.0 μmol/h in terms of zirconium.

The polymerization temperature was set to 60° C., and a polymerization reaction was performed while propylene and hydrogen were continuously supplied so that the hydrogen partial pressure and the total pressure in the reaction vessel were kept at 0.16 MPa and 1.0 MPa, respectively.

The n-heptane serving as the solvent of the resultant polymerization solution was removed to provide polypropylene (polymerization activity: 0.3 tPP/gZr, [η]=0.79 dL/g). The results are shown in Table 2 below.

TABLE 2

| Item | Example 4 | Example 5 | Comparative Example 4 | Comparative Example 5 |
|---|---|---|---|---|
| Kind of complex | Catalyst C | Catalyst C | Catalyst C | Catalyst C |
| Addition amount of component (A) (μmol-Zr/h)*1 | 990 | 7.4 | 5,570 | 9 |
| Addition amount of component (D) (mmol/h) | 15 | 2.1 | 0 | 0 |
| Presence amount of component (N) (solution portion-ppm by mass) | 91 | 1,000 | 91 | 1,000 |
| Presence amount of component (N) (gas portion-ppm by volume) | 973 | — | 973 | — |
| In terms of presence amount of component (N) (mol/h) | 33.8 | 0.21 | 29.2 | 0.21 |
| Molar ratio [(D)/(A)] (mol/mol-Zr)*2 | 15 | 280 | 0 | 0 |
| Molar ratio [(D)/(C)] (mol/mol-Al)*3 | 0.09 | 0.08 | 0 | 0 |
| Molar ratio [(N)/(A)] (mol/mol-Zr)*4 | 34,141 | 28,378 | 5,242 | 23,333 |
| Polymerization activity (tPP/gZr)*5 | 18.0 | 11.0 | 0.1 | 0.3 |
| [η] (dL/g) | 0.56 | 0.83 | 0.56 | 0.79 |

*1: Molar quantity in terms of zirconium (Zr)
*2: Ratio of molar quantity of component (D) to molar quantity of Zr in component (A)
*3: Ratio of molar quantity of component (D) to molar quantity of Al in component (C)
*4: Ratio of molar quantity of component (N) to molar quantity of Zr in component (A)
*5: Amount of polypropylene obtained per 1 g of Zr in component (A) Industrial Applicability Through the use of the production method for an olefin-based polymer and the olefin polymerization catalyst of the present invention, catalytic activity at the time of polymerization is high, and an olefin-based polymer of intended quality can be produced. In particular, the production method for an olefin-based polymer and the olefin polymerization catalyst can be used more usefully in a continuous polymerization system including a step of recycling a polymerization solvent or the like.

The invention claimed is:

1. A production method for polypropylene, the production method comprising polymerizing propylene in the presence of the following components (A) to (D):
   (A) a transition metal compound;
   (B) a boron compound capable of forming an ion pair with the component (A);
   (C) an organoaluminum compound; and
   (D) water, wherein:
a molar ratio [(D)/(A)] of a molar quantity of the component (D) to a molar quantity of a transition metal in the component (A) is 5 or more and 10,000 or less;
a molar ratio [(D)/(C)] of the molar quantity of the component (D) to a molar quantity of an aluminum atom in the component C) is more than 0 and 0.9 or less;
the transition metal compound (A) is a double crosslinked metallocene complex represented by a formula (I):

$$A^1 \underset{E^2}{\overset{E^1}{\diamond}} A^2 \underset{}{\overset{}{\diamond}} MX_qY_r;$$

M represents a metal element of Groups 3 to 10 of the periodic table or the lanthanoid series;
$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, form a crosslinked structure via $A^1$ and $A^2$, and may be identical to or different from each other;
X represents a σ-bonding ligand, and when a plurality of X's are present, the plurality of X's may be identical to or different from each other, and X may be crosslinked with any other X, $E^1$, $E^2$, or Y;
Y represents a Lewis base, and when a plurality of Y's are present, the plurality of Y's may be identical to or different from each other, and Y may be crosslinked with any other Y, $E^1$, $E^2$, or X;
$A^1$ and $A^2$ each represent a divalent crosslinking group for bonding two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein R$^1$ represents a hydrogen atom, a halogen atom, a hydrocarbon group having 1 to 20 carbon atoms, or a halogen-containing hydrocarbon group having 1 to 20 carbon atoms, and may be identical to or different from each other;
q represents an integer of from 1 to 5 representing [(valence of M)-2]; and
r represents an integer of from 0 to 3.

2. The production method according to claim 1, wherein the propylene or a polymerization solvent comprises (N) a nonpolymerizable unsaturated hydrocarbon.

3. The production method according to claim 2, wherein the nonpolymerizable unsaturated hydrocarbon (N) comprises a disubstituted olefin, a trisubstituted olefin, or a tetrasubstituted olefin represented by the following general formula (i), or an alkyne represented by the following general formula (ii):

$$\underset{R^b}{\overset{R^a}{\diagdown}} C = C \underset{R^d}{\overset{R^c}{\diagup}} \quad (i)$$

-continued

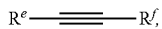
(ii)

wherein:
in the general formula (i),
$R^a$ to $R^d$ each independently represent hydrogen or a hydrocarbon group having 1 or more carbon atoms, provided that at least two or more selected from $R^a$ to $R^d$ each represent the hydrocarbon group having 1 or more carbon atoms; and
$R^e$ and $R^f$ each independently represent hydrogen or a hydrocarbon group having 1 or more carbon atoms.

4. The production method according to claim 2, wherein a molar ratio [(N)/(A)] of a molar quantity of the component (N) to a molar quantity of a transition metal in the component (A) is 500 or more.

5. The production method according to claim 1, wherein:
the transition metal compound (A) is a double crosslinked metallocene complex represented by a formula (II):

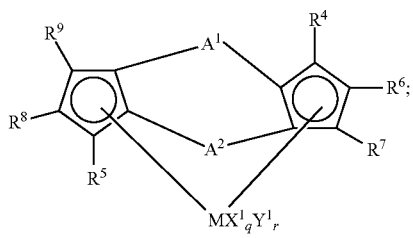
(II)

M represents a metal element of Groups 3 to 10 of the periodic table or the lanthanoid series;
$X^1$ represents a σ-bonding ligand, and when a plurality of $X^1$'s are present, the plurality of $X^1$'s may be identical to or different from each other, and $X^1$ may be crosslinked with any other $X^1$ or $Y^1$;
$Y^1$ represents a Lewis base, and when a plurality of $Y^1$'s are present, the plurality of $Y^1$'s may be identical to or different from each other, and $Y^1$ may be crosslinked with any other $Y^1$ or $X^1$;
$A^1$ and $A^2$ each represent a divalent crosslinking group for bonding two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group having 1 to 20 carbon atoms, or a halogen-containing hydrocarbon group having 1 to 20 carbon atoms, and may be identical to or different from each other;
$R^4$ to $R^9$ each represent a hydrogen atom, a halogen atom, a hydrocarbon group having 1 to 20 carbon atoms, a halogen-containing hydrocarbon group having 1 to 20 carbon atoms, a silicon-containing group, or a hetero atom-containing group, and it is necessary that at least one of $R^4$ to $R^9$ not represent a hydrogen atom:
q represents an integer of from 1 to 5 representing [(valence of M)-2]; and
r represents an integer of from 0 to 3.

\* \* \* \* \*